United States Patent
Wu et al.

(10) Patent No.: US 12,249,353 B1
(45) Date of Patent: *Mar. 11, 2025

(54) DISK WRITING MODE PROVIDING MAIN POLE RELAXATION

(71) Applicant: Marvell Asia Pte Ltd, Singapore (SG)

(72) Inventors: Kai Wu, Singapore (SG); Mats Oberg, San Jose, CA (US); Hao Fang, Eden Praire, MN (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/392,038

(22) Filed: Dec. 21, 2023

Related U.S. Application Data (63) Continuation of application No. 18/053,470, filed on Nov. 8, 2022, now Pat. No. 11,894,025.

(60) Provisional application No. 63/318,378, filed on Mar. 9, 2022, provisional application No. 63/318,366, filed on Mar. 9, 2022.

(51) Int. Cl.
*G11B 5/00* (2006.01)
*G11B 5/012* (2006.01)
*G11B 5/49* (2006.01)

(52) U.S. Cl.
CPC .......... *G11B 5/012* (2013.01); *G11B 5/4946* (2013.01)

(58) Field of Classification Search
CPC ..... G11B 5/012; G11B 5/4946; G11B 11/105; G11B 20/10009; G11B 27/24; G11B 7/125; G11B 7/00456; G11B 7/0945; G11B 11/10; G11B 2005/0021; G11B 5/09; G11B 5/39; G11B 20/10222; G11B 2005/0018; G11B 5/00; G11B 20/10037; G11B 20/1217; G11B 5/6047; G11B 11/10508; G11B 11/10588; G11B 20/12; G11B 4/4936
USPC ......................................................... 360/46
See application file for complete search history.

(56) References Cited

U.S. PATENT DOCUMENTS

| | | | |
|---|---|---|---|
| 7,142,382 B2 | 11/2006 | Nagano | |
| 10,734,016 B2 | 8/2020 | Oberg et al. | |
| 10,984,822 B2 | 4/2021 | Oberg et al. | |
| 11,270,723 B2 | 3/2022 | Oberg et al. | |
| 11,735,209 B2 * | 8/2023 | Okubo | G11B 5/012 |
| | | | 360/46 |
| 11,894,025 B1 * | 2/2024 | Wu | G11B 5/4946 |
| 2013/0128375 A1 | 5/2013 | Livshitz et al. | |

* cited by examiner

*Primary Examiner* — Nabil Z Hindi (57) ABSTRACT

A method for writing data to a magnetic data storage medium includes detecting whether the duration, before occurrence of a data transition, of data to be written exceeds a predetermined threshold, and, when the duration, before the occurrence of the data transition, of the data to be written exceeds the predetermined threshold, writing the data by applying an initial pulse and then maintaining a steady-state write current for a defined interval, and when the duration, before the occurrence of the data transition, of the data to be written is at most equal to the predetermined threshold, writing the data by applying the initial pulse without applying a steady-state write current before the data transition. The predetermined threshold may be determined by size of a magnetic bubble formed when writing a single bit to the magnetic data storage medium. A subsequent pulse may be applied following the defined interval.

24 Claims, 10 Drawing Sheets

DISK WRITING MODE PROVIDING MAIN POLE RELAXATION

CROSS REFERENCE TO RELATED APPLICATION

This is a continuation of commonly-assigned U.S. patent application Ser. No. 18/053,470, filed Nov. 8, 2022 (now U.S. Pat. No. 11,894,025), which claims the benefit of, commonly-assigned United States Provisional Patent Application Nos. 63/318,366 and 63/318,378, both filed Mar. 9, 2022, each of which is hereby incorporated by reference herein in its respective entirety.

FIELD OF USE

This disclosure relates to the writing of data to magnetic disk drives. More particularly, this disclosure relates to a pulsed writing mode providing for main pole relaxation prior to a bit transition.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the subject matter of the present disclosure.

In a magnetic disk drive, the main pole of a write bubble of even the shortest duration can extend several bit periods in the down-track direction. Thus, for example, whether writing one, two or three bits, a bubble with a duration of at least three bit periods (3T) may be created, and must be overcome by an opposite pulse if a bit transition is needed.

SUMMARY

In accordance with implementations of the subject matter of this disclosure, a method for writing data to a magnetic data storage medium includes detecting whether duration, before occurrence of a data transition, of data to be written exceeds a predetermined threshold, and, when the duration, before the occurrence of the data transition, of the data to be written exceeds the predetermined threshold, writing the data by applying an initial pulse and then maintaining a steady-state write current for a defined interval, and when the duration, before the occurrence of the data transition, of the data to be written is at most equal to the predetermined threshold, writing the data by applying the initial pulse without applying a steady-state write current before the data transition.

In a first implementation of such a method, the predetermined threshold may be determined by size of a magnetic bubble formed when writing a single bit to the magnetic data storage medium.

According to a first aspect of that first implementation, when the duration, before the occurrence of the data transition, of the data to be written is a single-bit duration, the writing may be performed by applying the initial pulse for all of the duration.

According to a second aspect of that first implementation, when the duration, before the occurrence of the data transition, of the data to be written exceeds a single-bit duration and the duration, before the occurrence of the data transition, of the data to be written is at most equal to the predetermined threshold, the writing may be performed by applying the initial pulse for a portion of the duration, without applying any signal after the portion of the duration.

According to a third aspect of that first implementation, the defined interval may be a remainder, following the initial pulse, of the duration before the occurrence of the data transition.

According to a fourth aspect of that first implementation, when the duration, before the occurrence of the data transition, of the data to be written exceeds the predetermined threshold, the defined interval may be shorter than a remainder, following the initial pulse, of the duration before the occurrence of the data transition, and the method may further include applying a subsequent pulse following the defined interval, without applying any signal during a following interval after the defined interval and the subsequent pulse and before the occurrence of the data transition.

In a first instance of that fourth aspect, applying the subsequent pulse following the defined interval may include applying the subsequent pulse immediately following the defined interval.

In a second instance of that fourth aspect, applying the subsequent pulse following the defined interval may include applying the subsequent pulse following the defined interval and a further interval during which no signal is applied.

A variation of that second instance may further include, when the duration, before the occurrence of the data transition, of the data to be written exceeds the predetermined threshold, adding a false transition to the data to signal when the subsequent pulse is to be applied.

According to that variation, the predetermined threshold may be three bit width periods, the subsequent pulse and the further interval may together occupy two bit width periods, and the defined interval may be at least one bit width period.

According to a fifth aspect of that first implementation, the predetermined threshold may be three bit width periods.

According to implementations of the subject matter of this disclosure, apparatus for writing data to a magnetic data storage medium includes a write head, preamplifier circuitry configured to generate write signals for input to the write head, and write channel controller circuitry configured to generate control signals for input to the preamplifier circuitry, the write channel controller circuitry being configured to detect whether duration, before occurrence of a data transition, of data to be written exceeds a predetermined threshold, and when the duration, before the occurrence of the data transition, of the data to be written exceeds the predetermined threshold, write the data by applying an initial pulse and then maintain a steady-state write current for a defined interval, and when the duration, before the occurrence of the data transition, of the data to be written is at most equal to the predetermined threshold, write the data by applying the initial pulse without applying a steady-state write current before the data transition.

In a first implementation of such apparatus, the predetermined threshold may be determined by size of a magnetic bubble formed when writing a single bit to the magnetic data storage medium.

According to a first aspect of that first implementation, the control circuitry may be configured to, when the duration, before the occurrence of the data transition, of the data to be written is a single-bit duration, perform the writing by applying the initial pulse for all of the duration.

According to a second aspect of that first implementation, the control circuitry may be configured to, when the duration, before the occurrence of the data transition, of the data to be written exceeds a single-bit duration and the duration, before the occurrence of the data transition, of the data to be written is at most equal to the predetermined threshold, perform the writing by applying the initial pulse for a portion of the duration, without applying any signal after the portion of the duration.

According to a third aspect of that first implementation, the control circuitry may be configured to maintain the steady-state write current for the defined interval by maintaining the steady-state write current for a remainder, following the initial pulse, of the duration before the occurrence of the data transition.

According to a fourth aspect of that first implementation, the control circuitry may be configured to, when the duration, before the occurrence of the data transition, of the data to be written exceeds the predetermined threshold, maintain the steady-state write current for the defined interval by maintaining the steady-state write current for a time period that is shorter than a remainder, following the initial pulse, of the duration before the occurrence of the data transition, and the control circuitry may be further configured to apply a subsequent pulse following the defined interval, without applying any signal during a following interval after the defined interval and the subsequent pulse and before the occurrence of the data transition.

In a first instance of that fourth aspect, the control circuitry may be configured to apply the subsequent pulse following the defined interval by applying the subsequent pulse immediately following the defined interval.

In a second instance of that fourth aspect, the control circuitry may be configured to apply the subsequent pulse following the defined interval by applying the subsequent pulse following the defined interval and a further interval during which no signal is applied.

In a variation of that second instance, the control circuitry may be configured to, when the duration, before the occurrence of the data transition, of the data to be written exceeds the predetermined threshold, add a false transition to the data to signal when the subsequent pulse is to be applied.

According to that variation, the predetermined threshold may be three bit width periods, the subsequent pulse and the further interval may together occupy two bit width periods, and the defined interval may be at least one bit width period.

According to a fifth aspect of that first implementation, the predetermined threshold may be three bit width periods.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Typically, when writing a number of bits, an initial pulse is applied to the write head, and then a steady-state write current of smaller amplitude is applied to the write head for the balance of the duration of the write period, to maintain the magnetization state of the recording medium. The pulse width may be 1T with no current tail for a 1T write duration, but for a write period of duration 2T or more, a pulse of slightly longer than 1T (referred to as an OSD pulse as discussed below) may be applied to change the magnetization state of the recording medium, with a steady-state write current applied for the balance of the duration of the write period.

As noted above, in a magnetic disk drive, the main pole of a write bubble of even the shortest duration can extend several bit periods in the down-track direction. Thus, for example, whether writing one, two or three bits (1T, 2T or 3T writing duration), a bubble with a duration of at least 3T may be created, and must be overcome by an opposite pulse if a bit transition is needed, which may have a negative impact on the magnetic profile leading to indistinct transitions.

Therefore, in accordance with implementations of the subject matter of this disclosure, the signal applied to the write head of a magnetic disk drive may be altered to allow the main pole to begin to relax (i.e., demagnetize) before the end of the write duration, so that if a bit transition follows, the magnetic profile is improved, leading to a sharper transition.

Specifically, the signal applied to the write head may include an initial pulse as described above, but, for shorter write durations, no steady-state current write is applied after the initial pulse, to allow the magnetization state of the recording medium to begin to relax. As indicated above, the main pole, even for a 1T pulse, may, for example, extend to 2T, 3T, or even longer, and therefore in some implementations, whether the write duration is 1T, 2T or 3T, an initial pulse is applied and is not followed by application of a steady-state write current, but is nevertheless sufficient for writing up to three bits. Specifically, in some of those implementations, it may be possible to use the same pulse for 1T, 2T and 3T write durations, but in order to provide a stronger signal for the 2T and 3T write durations, in other implementations, the initial pulse may have an "overshoot amplitude" (OSA) and an "overshoot duration" (OSD) longer than the pulse for a 1T write duration, to achieve the desired change in the magnetization state of the recording medium, but the OSD pulse still would not be followed by a steady-state write current.

In order to further improve write performance, for write durations longer than 3T, an additional OSD pulse, followed by an absence of a steady-state write current, may be applied toward the end of the write duration to remagnetize the storage medium. For example, the final 2T period of the write duration may begin with an OSD pulse (somewhat longer than 1T), with the signal turned off (i.e., no steady-state write current) for the balance of the write period. In some such implementations, the steady-state write current is turned off for at least 1T after the initial pulse and before the final OSD pulse.

Thus, for example, in some implementations, for a 4T write duration, there is an initial pulse similar to that for a 1T write duration, followed by a 1T period of zero write current, followed by a 2T period occupied by the final OSD pulse and a final zero write current segment. In such implementations, for a 5T write duration, the initial 2T period may be occupied by an initial OSD pulse followed by a steady-state write current, after which there would be a 1T period of zero write current, followed by a 2T period occupied by the final OSD pulse and a final zero write current segment (as described in connection with the 4T write duration). For longer write durations, after an initial OSD pulse, the steady-state write current would end 4T before the end of the write period, followed by a 2T period of zero write current and a 2T period occupied by the final OSD pulse and a final zero write current segment (as described in connection with the 4T and 5T write durations).

As described in more detail below, existing write channel circuitry may be configured in accordance with implementations of the subject matter of this disclosure to send appropriate control signals, along with the data to be written, to a preamplifier which controls the write head, to apply a pulsed mode as described above when the write duration will be less than a predetermined duration. In the implementations described below, the predetermined duration is 3T (encompassing write durations of 1T, 2T and 3T), but the specific predetermined duration may vary depending on the characteristics of a particular drive, including, without limitation, storage density and rotational speed.

The subject matter of this disclosure may be better understood by reference to FIGS. 1-10.

Figure 1:
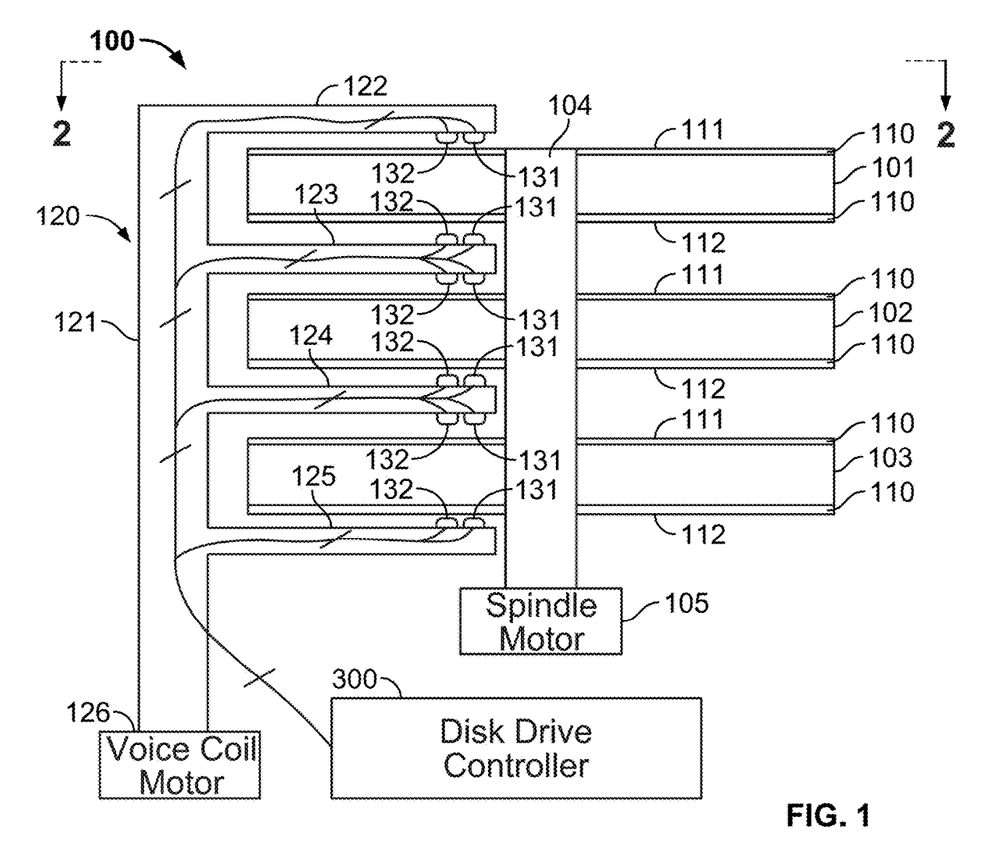
FIGS. 1 and 2 show an example of a disk drive with which the subject matter of the present disclosure may be used.
Figure 2:
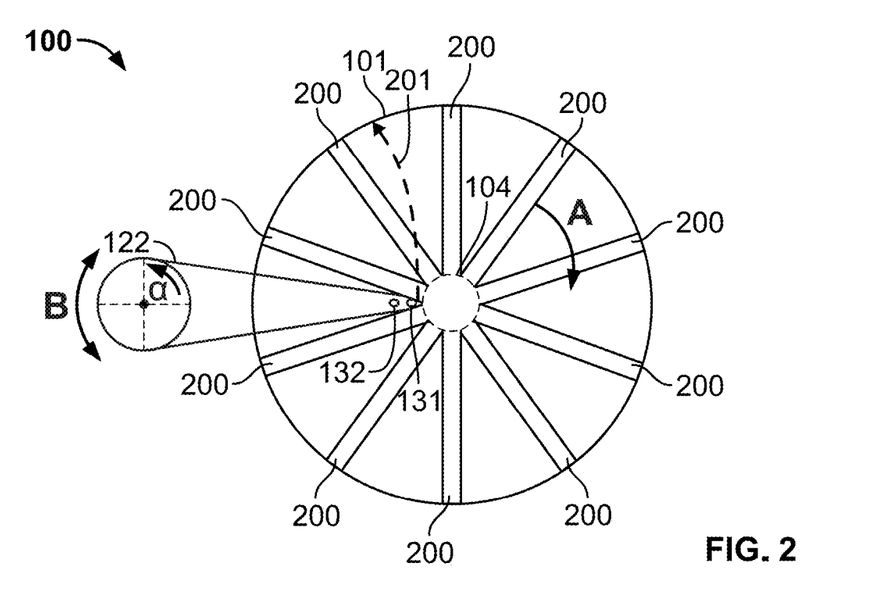

FIGS. 1 and 2 show an example of a disk drive 100 with which the subject matter of the present disclosure may be used. In this particular example, disk drive 100 has three platters 101, 102, 103, although any number of platters may be included in a disk drive with which the subject matter of the present disclosure may be used. As shown, each platter 101, 102, 103 has, on each of its upper and lower surfaces 111, 112, a coating 110 made from a material in which data can be stored, e.g., magnetically. The present disclosure also is relevant to a disk drive in which one or more platters includes coating 110 on only one of its surfaces, but such a disk drive would store less data in the same volume than a disk drive with two-sided platters. The platters 101-103 are mounted on a rotatable spindle 104. Spindle motor 105 rotates spindle 104 to rotate platters 101-103 in the direction of arrow A (FIG. 2). Although spindle motor 105 is shown connected directly to spindle 104, in some cases spindle motor 105 may be located off-axis of spindle 104 and would be connected to spindle 104 through belts or gears (not shown).

Read/write head assembly 120 includes an actuator 121 that bears arms 122-125, one of which is disposed adjacent to each surface 111, 112 of a platter 101, 102, 103 that has a memory storage coating 110. In this example, with heads on both surfaces of each of arms 123, 124, that amounts to four arms 122-125, but in the single-sided platter example discussed above, there would be only three arms. In other examples, the number of arms would increase or decrease along with the number of platters.

Each arm 122-125 bears, at or near its end furthest from actuator 121, and on both its upper and lower surfaces in the case of arms 123, 124, a plurality of read heads/sensors and write heads. In this case, two sensors 131, 132 are shown, and may represent, respectively, read and write sensors, although it in some applications each arm 123, 124 may bear more than one read head/sensor and more than one write head (not shown). In the configuration shown in FIGS. 1 and 2, arms 122-125 are aligned along a radius of platters 101-103. However, it should be noted that FIGS. 1 and 2 are schematic only and not to scale. Normally, the spindle diameter would be larger relative to the disk diameter. Moreover, arms 122-125 normally cannot point directly at the center of the disk.

A motor 126, commonly referred to as a "voice-coil motor," rotates actuator 121 back and forth along the directions of arrow B (FIG. 2) to move the heads 131, 132 along the path indicated by dashed arrow 201. The motion of actuator 121 thus changes both the radial and circumferential positions of heads 131, 132, but the circumferential positional change is relatively unimportant insofar as the platters are rotating. The motion of actuator 121 thus is used to control the radial position of heads 131, 132.

Servo "wedges" 200 are located on surface 111 of platter 101 (the other surfaces are similar) as shown in FIG. 2. Each servo wedge 200 includes data identifying it by wedge index, track index, or sector number (to give an angular, tangential or circumferential position) and by data representing, at each point along a radius of the platter, the distance from spindle 104. Although the boundaries of each wedge 200 are shown as being parallel, that may be the case in some implementations such as constant-density servo implementations, but in other implementations wedges 200 will actually be wedge-shaped, with boundaries extending along radii of the platter.

Figure 3:
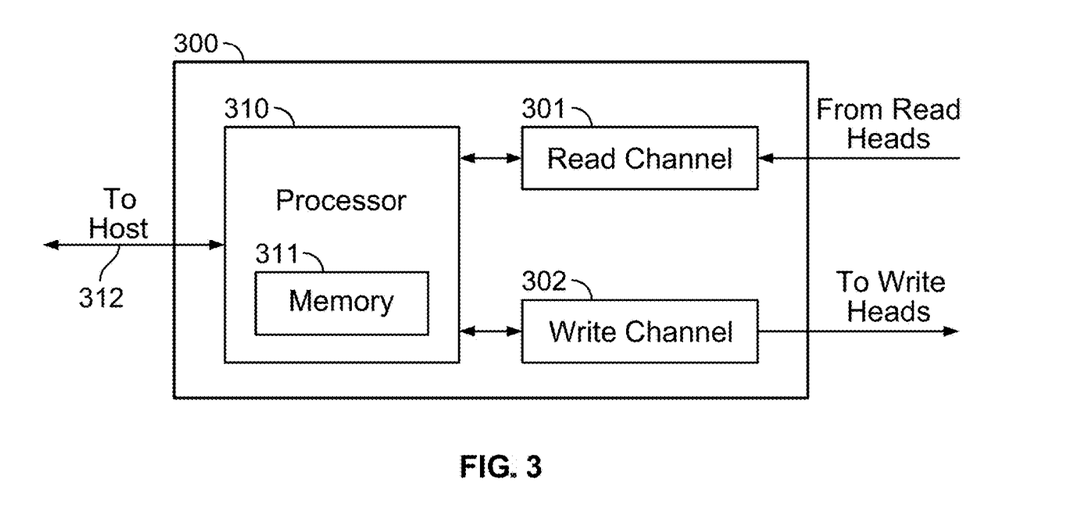
FIG. 3 is a diagram of a hard drive controller that may be used in a disk drive as in FIGS. 1 and 2 in implementations of the subject matter of this disclosure.

Each of read/write heads 131, 132 is connected to a read channel 301 and a write channel 302 of a hard drive controller 300 (FIG. 3). Hard drive controller 300 also includes a processor 310 and memory 311, as well as a connection 312 to a host processor (not shown). A servo control loop in hard drive controller 300 uses position error sensor (PES) data and the servo wedge data to keep the heads 131, 132 on track.

Figure 4:
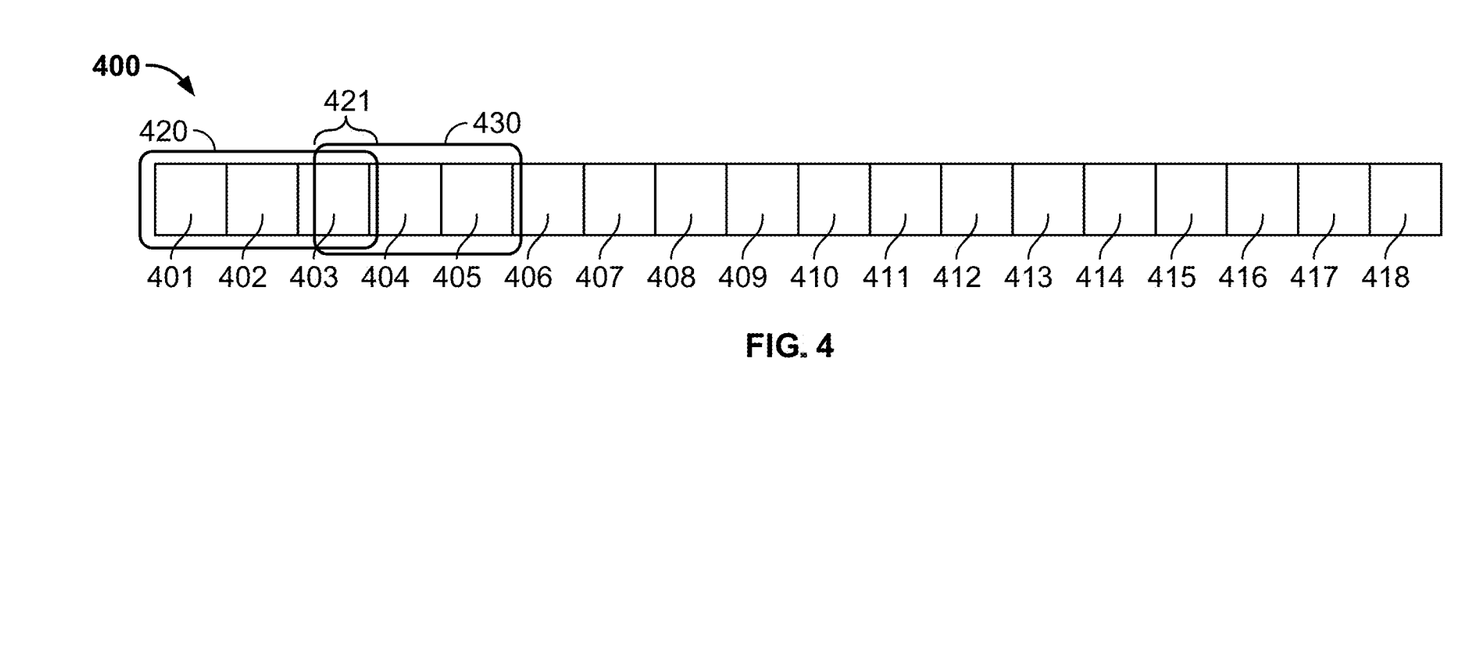
FIG. 4 is a representation, in simplified form, of a data track of a disk drive according to some implementations of the subject matter of this disclosure.

FIG. 4 shows, in simplified form, one data track 400 of disk drive 100 according to some implementations of the subject matter of this disclosure. Track 400 is depicted linearly, although in actuality it may be circular. Each square 401-418 represents the area occupied by one data bit, although the shape of such an area, and its length relative to the width of track 400, may not be to scale.

In order to write one bit of data to one of areas 401-418, a signal is applied to a write head 132 for a duration corresponding to the amount of time that the write head 132 is over that one of areas 401-418, at the disk rotational speed. As discussed above, if a pulse is applied to area 401 for a duration of 1T to write a bit only to area 401, a magnetic bubble 420 will be formed that not only extends over area 401, but also may extend over areas 402, 403, corresponding to a duration of about 3T. The same magnetic bubble might form if one were attempting to write two bits (to areas 401, 402) or three bits (to areas 401-403).

If one were not attempting, however, to write three bits, there may be a new write attempt at area 403 (assuming, e.g., that only one or two bits were being written by magnetic bubble 420), creating a new magnetic bubble 430. As drawn, magnetic bubble 430 also has a 3T duration, but magnetic bubble 430 could have a longer duration if four or more bits were to be written by magnetic bubble 430. If magnetic bubble 430 represents the writing of bits opposite that, or those, written by magnetic bubble 420, then during the overlap period 421, magnetic bubble 430 has to overcome the effects of magnetic bubble 420, leading to an indistinct or blurry bit transition.

Therefore, in order to provide a sharper bit transition at the writing event that generates magnetic bubble 430, the signal or signals that generate magnetic bubble 420 may be turned off, or reduced, early, to allow the main pole of magnetic bubble 420 to begin to relax prior to the initiation of magnetic bubble 430.

Figure 5:
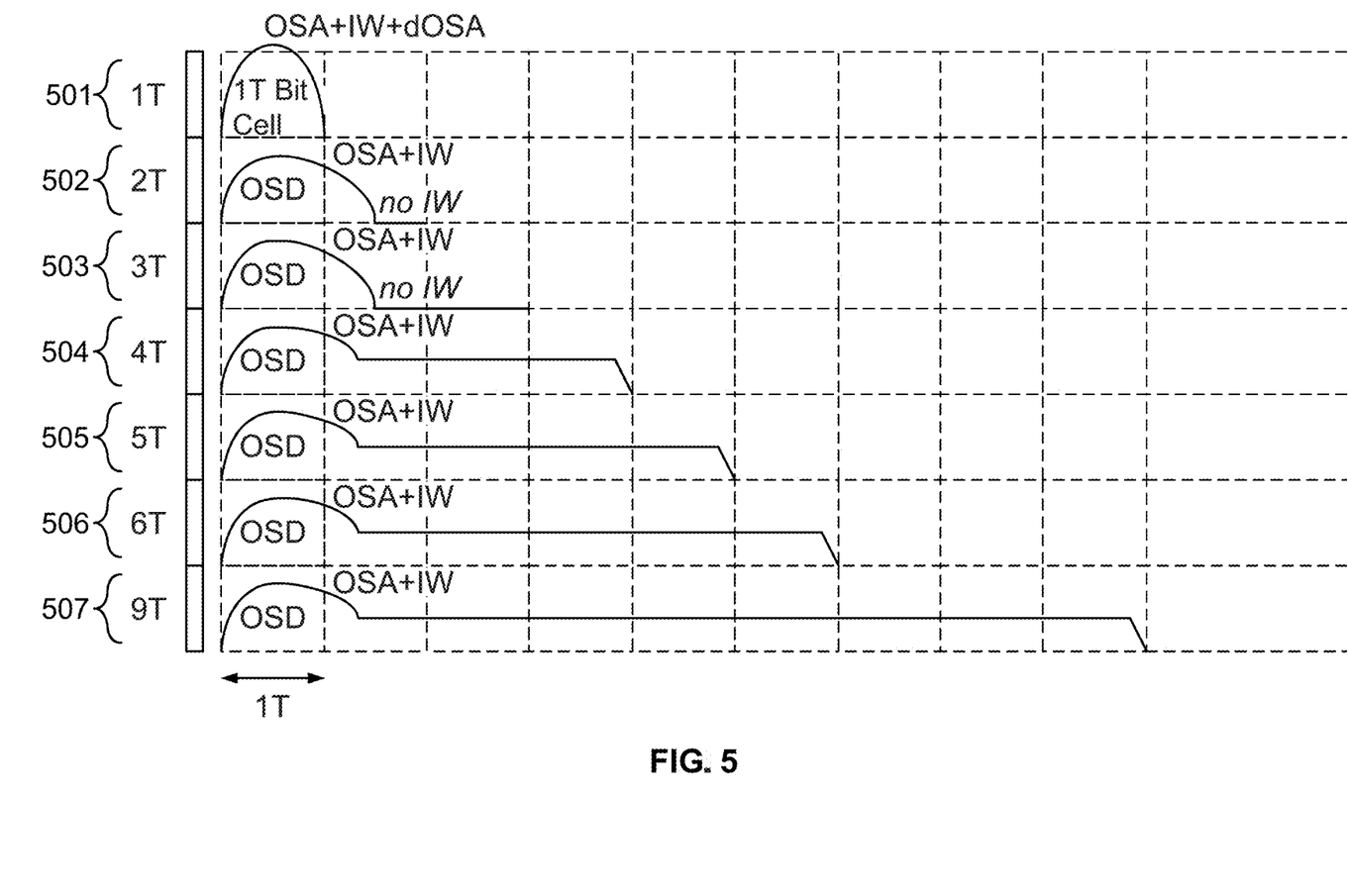
FIG. 5 shows a first pattern of pulses that may be applied to the write head of a disk drive in accordance with the subject matter of this disclosure.

According to some implementations, the pulses applied to the write head may be those shown in FIG. 5. For a write duration of 1T, a 1T pulse as shown at 501 may be applied. For such a short lone 1T pulse, additional current, known as dynamic overshoot amplitude (dOSA) may be applied as is typically done. For a write duration of 2T, a pulse having an OSD duration longer than 1T but shorter than 2T may be applied to achieve the desired magnetization state, without a subsequent steady-state write current IW to allow the magnetization state to begin to relax, as shown at 502. For a write duration of 3T, an OSD pulse may be applied to achieve the desired magnetization state, without a subsequent steady-state write current IW to allow the magnetization state to begin to relax, as shown at 503, similar to the pulse applied at 502. The absence of a subsequent steady-state write current in these implementations allows the main pole to begin to relax, allowing sharper transitions as described above.

For longer write durations (4T, 5T, 6T and 9T as shown, respectively, at 504, 505, 506, 507), where the initial 3T magnetic bubble would not be long enough, then a more typical pulse profile—i.e., an OSD pulse, followed by a steady-state write current IW for the balance of the write duration, may be applied. A similar pulse profile may be applied for write durations of 7T and 8T (not shown). For these longer write durations, the benefits of sharper transitions that are achieved for shorter write durations might not be achieved.

As described above, for write durations longer than 3T, an additional OSD pulse, followed by an absence of a steady-state write current IW, may be applied toward the end of the write duration to remagnetize the storage medium. For example, the final 2T period of the write duration may begin with an OSD pulse, with the signal turned off (i.e., no steady-state write current) for the balance of the write period. In some such implementations, the steady-state write current IW is turned off for at least 1T after the initial OSD pulse and before the final OSD pulse.

Figure 6:
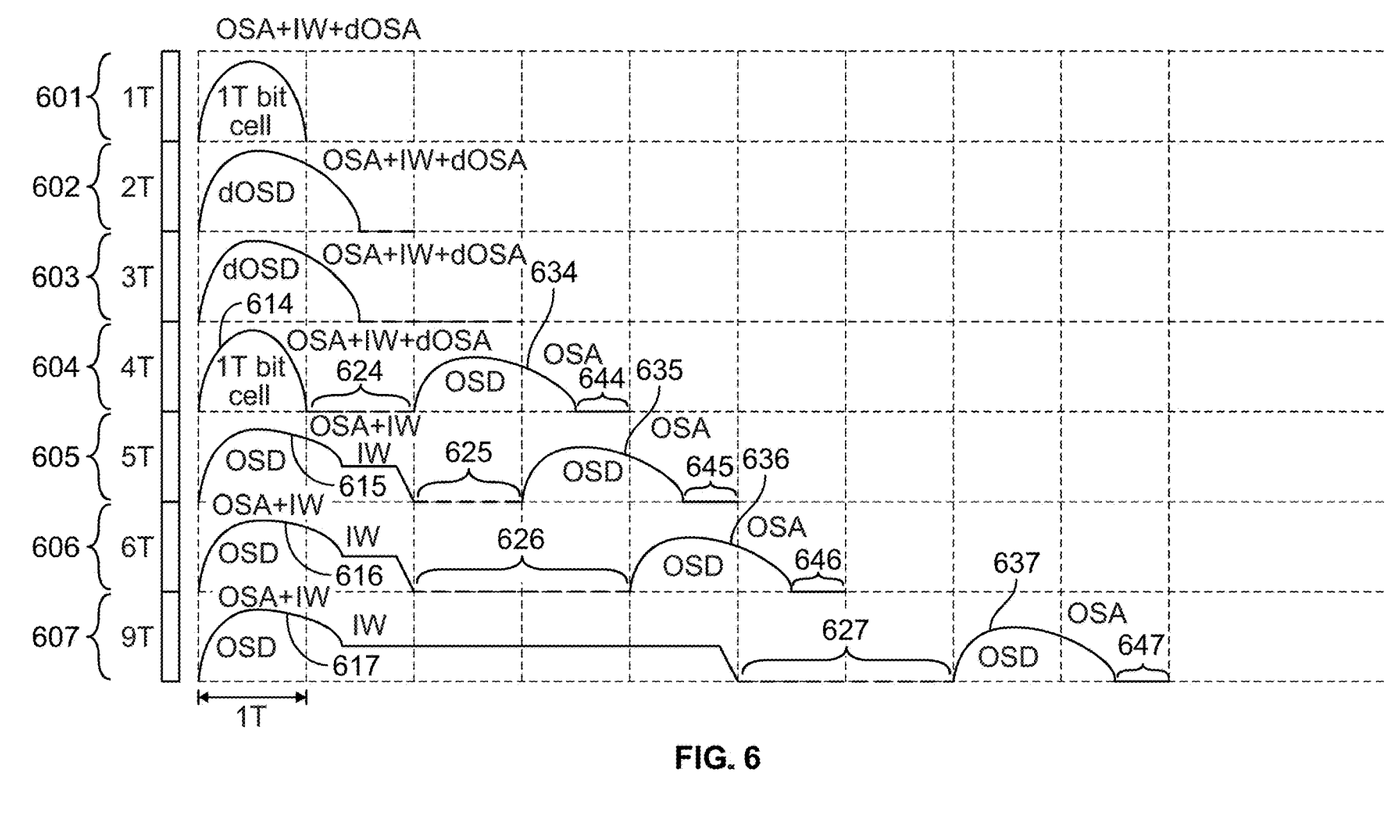
FIG. 6 shows a second pattern of pulses that may be applied to the write head of a disk drive in accordance with the subject matter of this disclosure.

Such an implementation is illustrated in FIG. 6. For write durations of 1T, 2T and 3T, the applied pulse patterns 601, 602, 603 are similar to applied pulse patterns 501, 502, 503 of FIG. 5. However, for each write duration 604, 605, 606, 607 of duration 4T or longer, the final 2T portion of the write duration includes a second OSD pulse followed by duration without a steady-state write current IW. In some such implementations, the steady-state write current is turned off for at least 1T after the initial OSD pulse and before the final OSD pulse.

Thus, for example, in some implementations, for a 4T write duration, there is an initial pulse 614 similar to that for a 1T write duration, followed by a 1T period 624 of zero write current, followed by a 2T period occupied by the final OSD pulse 634 and a final zero write current segment 644. In such implementations, for a 5T write duration, the initial 2T period may be occupied by an initial OSD pulse 615 followed by a steady-state write current IW, after which there would be a 1T period 625 of zero write current, followed by a 2T period occupied by the final OSD pulse 635 and a final zero write current segment 645 (as described in connection with the 4T write duration). For longer write durations, after an initial OSD pulse 616, the steady-state write current IW would end 4T before the end of the write period, followed by a 2T period 626 of zero write current and a 2T period occupied by the final OSD pulse 636 and a final zero write current segment 646 (as described in connection with the 4T and 5T write durations).

Figure 7:
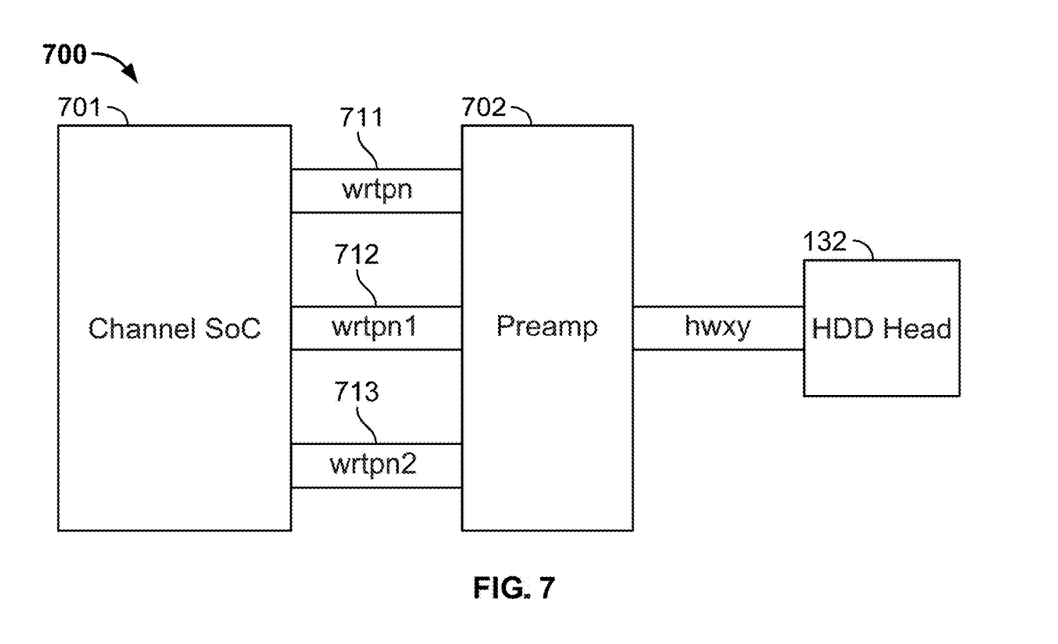
FIG. 7 is a block diagram of an implementation of a write channel in accordance with the subject matter of this disclosure.

Implementations of hard drive controller 300, and particularly write channel 302, may be configured to apply pulsed write patterns such as those described in FIGS. 5 and 6 (or that are otherwise within the scope of this description). As shown in FIG. 7, an implementation 700 of write channel 302 may include a write channel circuitry 701 (which may be a system-on-chip relying on processor 310 or including its own processor or firmware circuitry, or may be hard-wired) to generate instruction signals 711, 712, 713 (as described below) for preamplifier circuitry 702 to apply the desired signals to write head 132.

Figure 8:
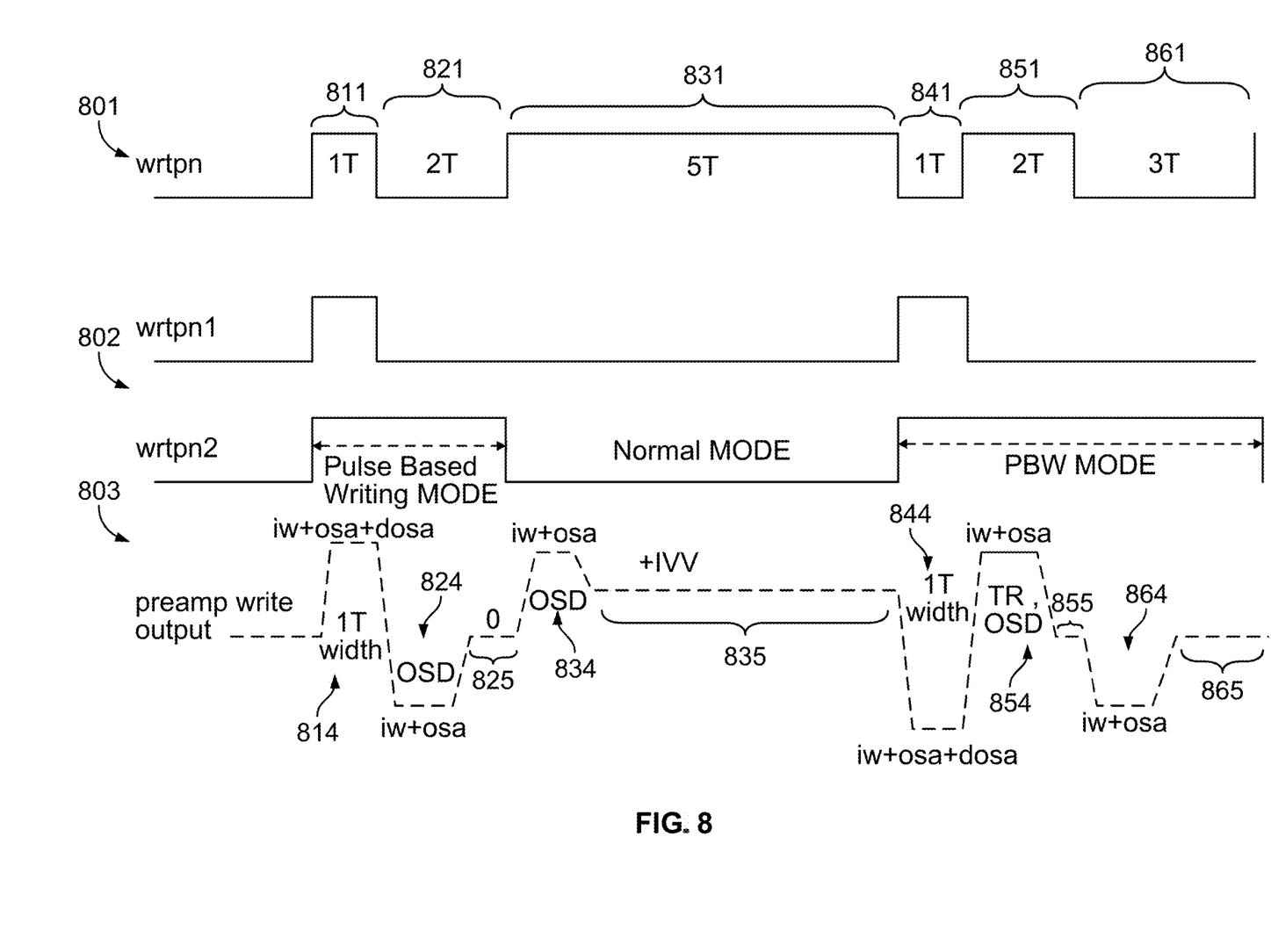
FIG. 8 shows an example of control signals that may generate the pulse pattern of FIG. 5.

The write pattern of FIG. 5 may be generated by the signals seen in FIG. 8. At least three signals are sent from write channel circuitry 701 to preamplifier 702. wrtpn signal 801 specifies the data to be written. In the example of FIG. 8, the data includes a '1', two '0s', 5 '1s', a '0', two '1s' and three '0s'. wrtpn1 signal 802 specifies that doSA (see above) is to be applied, and is asserted when the data on wrtpn signal 801 has a duration of 1T (whether a single '1' or a single '0'). wrtpn2 signal 803 specifies when the pulsed writing mode described in connection with FIG. 5 is to be applied. Thus, because each of 1T write duration 811, 2T write duration 821, 1T write duration 841, 2T write duration 851 and 3T write duration 861 have durations at most equal to 3T, wrtpn2 signal 803 is asserted to specify the pulsed writing mode for all of those write durations. Of the write durations shown, only 5T write duration 831 is longer than 3T and therefore wrtpn2 signal 803 is deasserted during that duration, signifying that typical writing mode—i.e., an OSD pulse followed by a steady-state write current for the entire duration—is to be used.

The resulting output of preamplifier circuitry 702 is shown at 804. For the first 1T pulse 811 of wrtpn signal 801, with wrtpn1 signal 802 asserted to signify the application of dOSA, and wrtpn2 signal 803 asserted to indicate pulsed mode operation, preamp output signal 804 is a pulse 814 of width 1T having an amplitude reflecting the dOSA "boost." For the next, 2T, pulse 821 of wrtpn signal 801, which reflects a bit transition, wrtpn1 signal 802 is no longer asserted meaning there is no dOSA boost, but wrtpn2 signal 803 is still asserted indicating pulsed mode is still in effect. Therefore, output pulse 824 of preamp output 804 is a negative OSD pulse having an amplitude reflecting OSA but not dOSA, followed by an interval 825 with zero write current.

For the next, 5T, pulse 831 of wrtpn signal 801, which again reflects a bit transition, wrtpn1 signal 802 is still not asserted meaning there is no dOSA boost, and wrtpn2 signal 803 also is not asserted (because of the duration 5T>3T) indicating pulsed mode is not in effect. Therefore, output pulse 834 of preamp output 804 is a positive OSD pulse having an amplitude reflecting OSA but not dOSA, followed by an interval 835 for the balance of the 5T duration with write current IW asserted.

For the next, 1T, pulse 841 of wrtpn signal 801, which reflects a negative bit transition, wrtpn1 signal 802 is again asserted because of the 1T duration, meaning there is a dOSA boost, and wrtpn2 signal 803 also again asserted (because of the duration 1T≤3T) indicating pulsed mode is again in effect. Therefore, output pulse 844 of preamp output 804 is a negative pulse having 1T duration and an amplitude reflecting a dOSA boost. The next, 2T, pulse 851 of wrtpn signal 801, reflects a positive bit transition. wrtpn1 signal 802 is no longer asserted meaning there is no dOSA boost, but wrtpn2 signal 803 is still asserted indicating pulsed mode is still in effect. Therefore, output pulse 854 of preamp output 804 is a positive OSD pulse having an amplitude reflecting OSA but not dOSA, followed by an interval 855 with zero write current for the balance of the 2T duration.

For the next, and final, 3T, pulse 861 of wrtpn signal 801, which reflects a negative bit transition, wrtpn1 signal 802 is no longer asserted, meaning there is no doSA boost, but wrtpn2 signal 803 remains asserted (because of the duration 3T≤3T) indicating pulsed mode remains in effect. Therefore, output pulse 864 of preamp output 804 is a negative OSD pulse having an amplitude reflecting OSA but not a dOSA boost, followed by an interval 865 with zero write current for the balance of the 3T duration.

Figure 9:
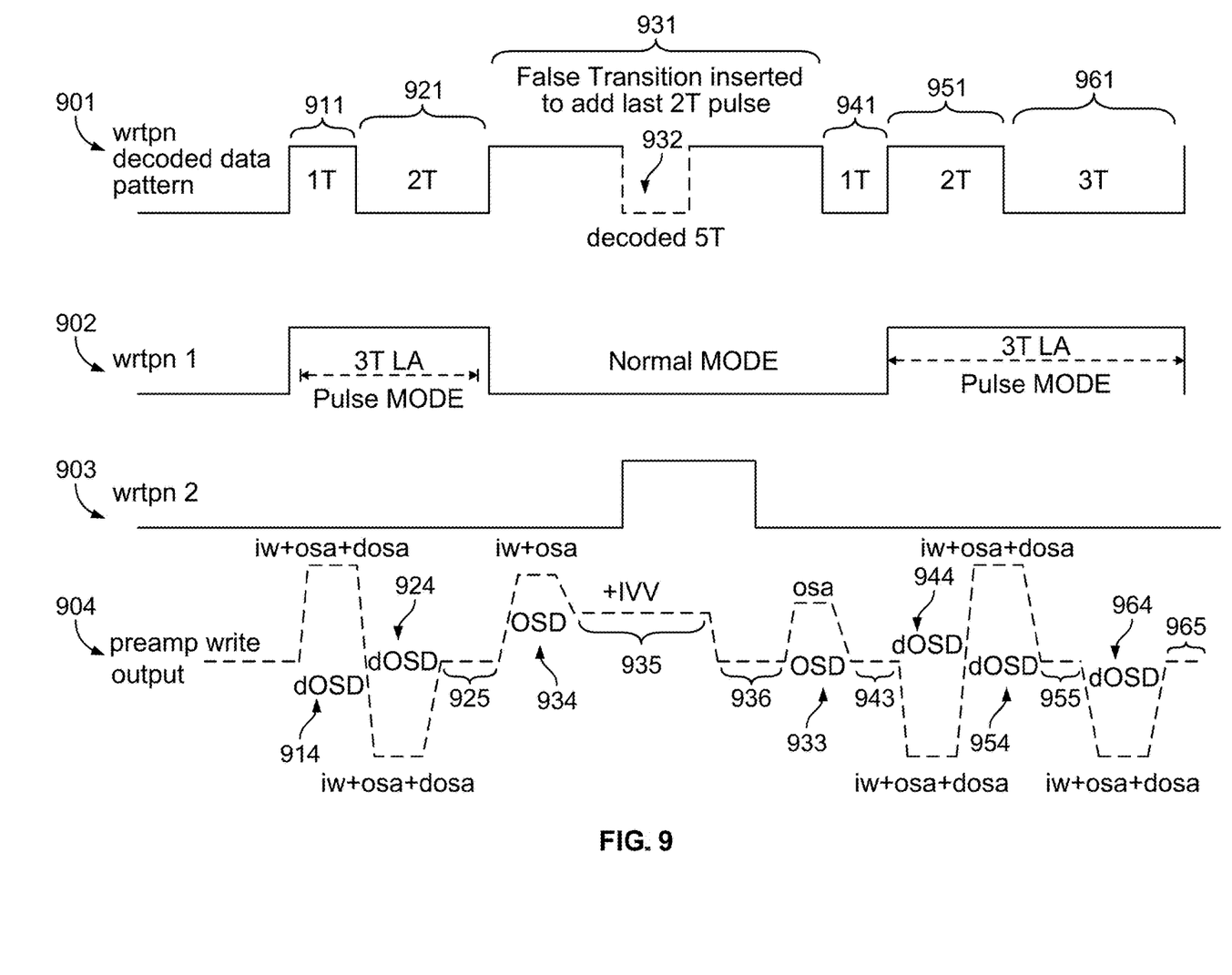
FIG. 9 shows an example of control signals that may generate the pulse pattern of FIG. 6.

The pulsed write pattern of FIG. 6 may be generated by the signals seen in FIG. 9. As in FIG. 8, at least three signals are sent from write channel circuitry 701 to preamplifier 702. However, unlike wrtpn data signal 801, wrtpn signal 901 is an encoded data signal to which adds false transition pulses within long-duration bit pulses to trigger the final OSD pulse referred to above in connection with FIG. 6. In the example of FIG. 9, the data again includes a '1', two '0s', 5 '1s', a '0', two '1s' and three '0s', encoded into wrtpn signal 901, which includes a false transition 932 within the 5T pulse. In this implementation, wrtpn1 signal 902 not only specifies that dOSA (see above) is to be applied when the data on wrtpn signal 801 has a duration of 1T (whether a single '1' or a single '0'), but also indicates that pulse mode is to be applied. A "3T look-ahead" mode is employed to keep wrtpn1 signal 902 asserted, allowing the signal 902 to perform both functions.

In this implementation, with pulsed writing indicated by wrtpn1 signal 902, wrtpn2 signal 903 indicates when a pulse of wrtpn signal 901 is a false pulse, to generate the final OSD pulse described above in connection with FIG. 6. Thus, because each of 1T write duration 911, 2T write duration 921, 1T write duration 941, 2T write duration 951 and 3T write duration 961 have durations at most equal to 3T, wrtpn1 signal 902 is asserted to specify the pulsed writing mode for all of those write durations. Of the write durations shown, only 5T write duration 931 is longer than 3T and therefore has false pulse 932 added, ending 2T before the end of write duration 931. wrtpn2 signal 903 is asserted as a result of pulse 932, to generate the final OSD pulse.

The resulting output of preamplifier circuitry 702 is shown at 904. For the first 1T pulse 911 of wrtpn signal 901, with wrtpn1 signal 902 asserted to signify the application of dOSA, and remains high, because of the 3T look-ahead, as long as pulse mode is needed (based on pulses having duration≤3T). Preamp output signal 904 is a pulse 914 of width 1T having an amplitude reflecting the dOSA boost. For the next, 2T, pulse 921 of wrtpn signal 901, which reflects a bit transition, wrtpn1 signal 902 is still asserted indicating that the dOSA boost and the pulsed mode are still in effect. Therefore, output pulse 924 of preamp output 904 is a negative OSD pulse having an amplitude reflecting dOSA, followed by an interval 925 with zero write current.

For the next, 5T, pulse 931 of wrtpn signal 901, which again reflects a bit transition, wrtpn1 signal 902 is no longer asserted meaning there is no doSA boost and (because of the duration 5T>3T where the 3T look-ahead does not detect any pulses of duration≤3T) pulsed mode is not in effect. Therefore, output pulse 934 of preamp output 904 is a positive OSD pulse having an amplitude reflecting OSA but not dOSA, followed by an interval 935 with write current IW asserted. However, because wrtpn2 signal 903 is asserted based on false pulse 932, an interval 936 of zero write current is triggered, followed by OSD pulse 933 followed by interval 943 with zero write current.

For the next, 1T, pulse 941 of wrtpn signal 901, which reflects a negative bit transition, wrtpn1 signal 902 is again asserted because of the 1T duration, meaning there is a doSA boost, and the 3T look-ahead at 2T and 3T pulses 951, 961 keeps pulsed mode in effect. Therefore, output pulse 944 of preamp output 904 is a negative pulse having 1T duration and an amplitude reflecting a dOSA boost. The next, 2T, pulse 951 of wrtpn signal 901, reflects a positive bit transition. wrtpn1 signal 902 remains asserted meaning there is a dOSA boost and pulsed mode is still in effect. Therefore, output pulse 954 of preamp output 904 is a positive OSD pulse having an amplitude reflecting dOSA, followed by an interval 955 with zero write current for the balance of the 2T duration.

For the next, and final, 3T, pulse 961 of wrtpn signal 901, which reflects a negative bit transition, wrtpn1 signal 902 remains asserted, meaning there is a dOSA boost and pulsed mode remains in effect. Therefore, output pulse 964 of preamp output 904 is a negative OSD pulse having an amplitude reflecting a dOSA boost, followed by an interval 965 with zero write current for the balance of the 3T duration.

Figure 10:
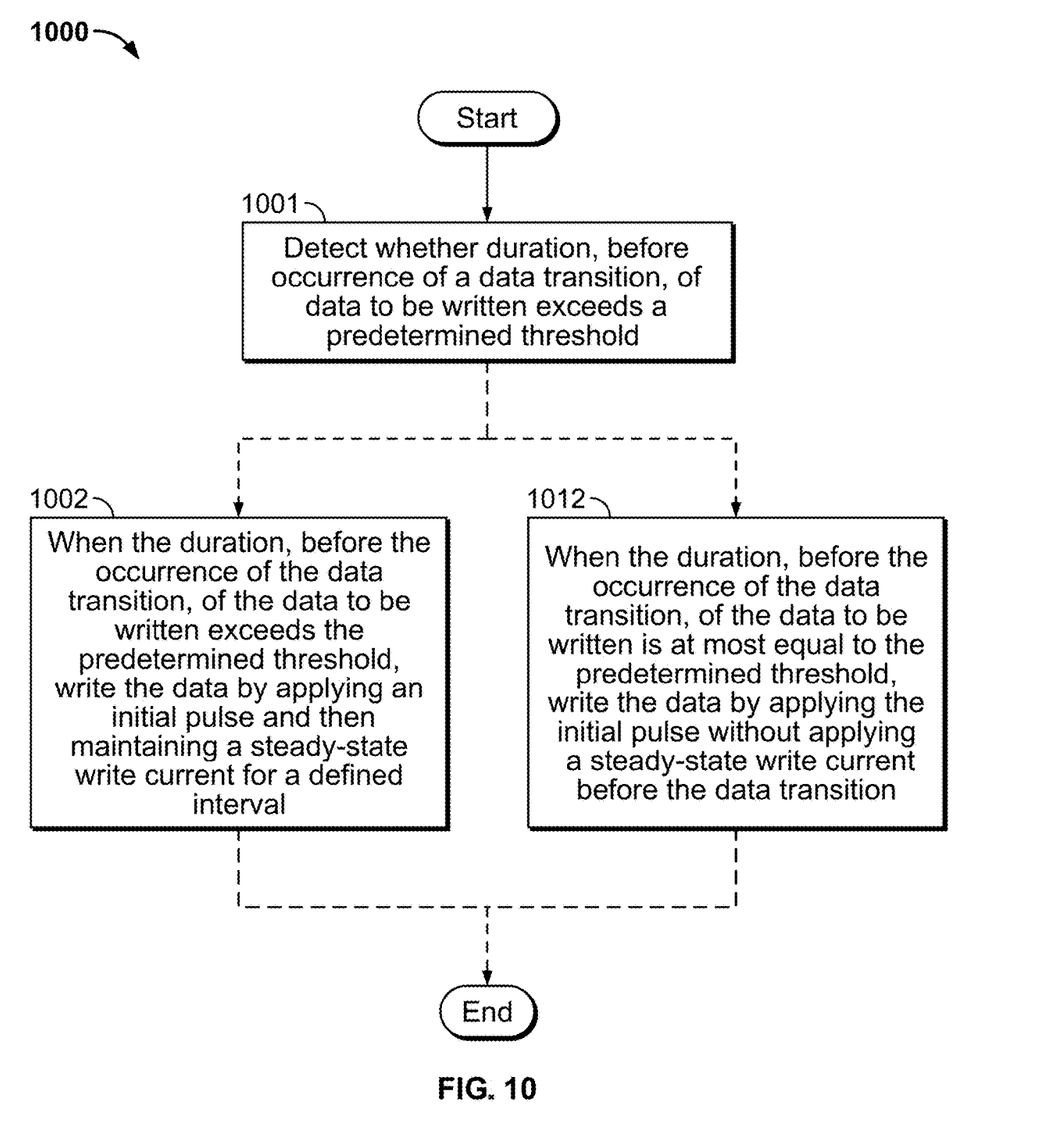
FIG. 10 is a flow diagram illustrating a method in accordance with implementations of the subject matter of this disclosure.

A method 1000 according to implementations of the subject matter of this disclosure for writing data to a magnetic data storage medium is diagrammed in FIG. 10. Method 1000 begins at 1001, where it is detected whether the duration, before occurrence of a data transition, of data to be written exceeds a predetermined threshold. When the duration, before the occurrence of the data transition, of the data to be written exceeds the predetermined threshold, then at 1002 the data is written by applying an initial pulse and then maintaining a steady-state write current for a defined interval. Alternatively, when the duration, before the occurrence of the data transition, of the data to be written is at most equal to the predetermined threshold, than at 1012 the data by applying the initial pulse without applying a steady-state write current before the data transition. Method 1000 then ends.

Thus it is seen that a pulsed writing mode in a disk drive, providing for main pole relaxation prior to a bit transition, has been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method for writing data to a magnetic data storage medium, the method comprising:
   detecting whether duration, before occurrence of a data transition, of data to be written exceeds a predetermined threshold; and
   writing the data by (1) applying an initial pulse to begin the writing, and then (2) based on the duration, before the occurrence of the data transition, of the data to be written, determining whether a write current is needed, following the initial pulse, to continue the writing, and (3) controlling the write current based on the determining.

2. The method, according to claim 1, for writing data to a magnetic data storage medium, wherein:
when the duration, before the occurrence of the data transition, of the data to be written exceeds the predetermined threshold:
the determining comprises determining that the write current is needed following the initial pulse, and
controlling the write current based on the determining comprises applying the write current at a steady-state value for a defined interval; and
when the duration, before the occurrence of the data transition, of the data to be written is at most equal to the predetermined threshold:
the determining comprises determining that the write current is not needed following the initial pulse, and
controlling the write current based on the determining comprises refraining from applying the write current before the data transition.

3. The method according to claim 2 for writing data to the magnetic data storage medium wherein the defined interval is a remainder, following the initial pulse, of the duration before the occurrence of the data transition.

4. The method according to claim 2 for writing data to the magnetic data storage medium, wherein:
when the duration, before the occurrence of the data transition, of the data to be written exceeds the predetermined threshold, the defined interval is shorter than a remainder, following the initial pulse, of the duration before the occurrence of the data transition; and
the method further comprises applying a subsequent pulse following the defined interval, without applying any signal during a following interval after the defined interval and the subsequent pulse and before the occurrence of the data transition.

5. The method according to claim 4 for writing data to the magnetic data storage medium, wherein applying the subsequent pulse following the defined interval comprises applying the subsequent pulse immediately following the defined interval.

6. The method according to claim 4 for writing data to the magnetic data storage medium, wherein applying the subsequent pulse following the defined interval comprises applying the subsequent pulse following the defined interval and a further interval during which no signal is applied.

7. The method according to claim 6 for writing data to the magnetic data storage medium, further comprising, when the duration, before the occurrence of the data transition, of the data to be written exceeds the predetermined threshold, adding a false transition to the data to signal when the subsequent pulse is to be applied.

8. The method according to claim 7 for writing data to the magnetic data storage medium, wherein:
the predetermined threshold is three bit width periods;
the subsequent pulse and the further interval together occupy two bit width periods; and
the defined interval is at least one bit width period.

9. The method according to claim 1 for writing data to the magnetic data storage medium wherein, when the duration, before the occurrence of the data transition, of the data to be written exceeds a single-bit duration and the duration, before the occurrence of the data transition, of the data to be written is at most equal to the predetermined threshold, the writing is performed by applying the initial pulse for a portion of the duration, without applying any signal after the portion of the duration.

10. The method according to claim 1 for writing data to the magnetic data storage medium wherein, when the duration, before the occurrence of the data transition, of the data to be written is a single-bit duration, the writing is performed by applying the initial pulse for all of the duration.

11. The method according to claim 1 for writing data to the magnetic data storage medium, wherein the predetermined threshold is determined by size of a magnetic bubble formed when writing a single bit to the magnetic data storage medium.

12. The method according to claim 11 for writing data to the magnetic data storage medium, wherein the predetermined threshold is three bit width periods.

13. Apparatus for writing data to a magnetic data storage medium, the apparatus comprising:
a write head;
preamplifier circuitry configured to generate write signals for input to the write head; and
write channel controller circuitry configured to generate control signals for input to the preamplifier circuitry, the write channel controller circuitry being configured to:
detect whether duration, before occurrence of a data transition, of data to be written exceeds a predetermined threshold, and
write the data by (1) applying an initial pulse to begin writing, (2) based on the duration, before the occurrence of the data transition, of the data to be written, determining whether a write current is needed, following the initial pulse, to complete the writing, and (3) controlling the write current based on the determining.

14. The apparatus of claim 13, wherein the write channel controller circuitry is configured to:
when the duration, before the occurrence of the data transition, of the data to be written exceeds the predetermined threshold, determine that the write current is needed following the initial pulse and then apply the write current at a steady-state value for a defined interval; and
when the duration, before the occurrence of the data transition, of the data to be written is at most equal to the predetermined threshold, determine that the write current is not needed following the initial pulse, and then refrain from applying the write current.

15. The apparatus of claim 14 wherein the control circuitry is configured to, when the duration, before the occurrence of the data transition, of the data to be written exceeds the predetermined threshold, maintain the steady-state write current for the defined interval by maintaining the steady-state write current for a remainder, following the initial pulse, of the duration before the occurrence of the data transition.

16. The apparatus of claim 14, wherein:
the control circuitry is configured to, when the duration, before the occurrence of the data transition, of the data to be written exceeds the predetermined threshold, maintain the steady-state write current for the defined interval by maintaining the steady-state write current for a time period that is shorter than a remainder, following the initial pulse, of the duration before the occurrence of the data transition; and
the control circuitry is further configured to apply a subsequent pulse following the defined interval, without applying any signal during a following interval after the defined interval and the subsequent pulse and before the occurrence of the data transition.

17. The apparatus of claim 16, wherein the control circuitry is configured to apply the subsequent pulse following the defined interval by applying the subsequent pulse immediately following the defined interval.

18. The apparatus of claim 16, wherein the control circuitry is configured to apply the subsequent pulse following the defined interval by applying the subsequent pulse following the defined interval and a further interval during which no signal is applied.

19. The apparatus of claim 18, wherein the control circuitry is configured to, when the duration, before the occurrence of the data transition, of the data to be written exceeds the predetermined threshold, add a false transition to the data to signal when the subsequent pulse is to be applied.

20. The apparatus of claim 19, wherein:
the predetermined threshold is three bit width periods;
the subsequent pulse and the further interval together occupy two bit width periods; and
the defined interval is at least one bit width period.

21. The apparatus of claim 14 wherein the control circuitry is configured to, when the duration, before the occurrence of the data transition, of the data to be written exceeds a single-bit duration and the duration, before the occurrence of the data transition, of the data to be written is at most equal to the predetermined threshold, perform the writing by applying the initial pulse for a portion of the duration, without applying any signal after the portion of the duration.

22. The apparatus of claim 14 wherein the control circuitry is configured to, when the duration, before the occurrence of the data transition, of the data to be written is a single-bit duration, perform the writing by applying the initial pulse for all of the duration.

23. The apparatus of claim 13 wherein the predetermined threshold is determined by size of a magnetic bubble formed when writing a single bit to the magnetic data storage medium.

24. The apparatus of claim 23, wherein the predetermined threshold is three bit width periods.

* * * * *